(12) United States Patent
Glugla

(10) Patent No.: US 8,037,874 B2
(45) Date of Patent: Oct. 18, 2011

(54) FUEL BASED CYLINDER KNOCK CONTROL

(75) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 42 days.

(21) Appl. No.: 12/137,169

(22) Filed: Jun. 11, 2008

(65) Prior Publication Data

US 2009/0308367 A1    Dec. 17, 2009

(51) Int. Cl.
F02B 13/00    (2006.01)

(52) U.S. Cl. ........ 123/575; 123/295; 123/299; 123/304; 123/431

(58) Field of Classification Search .......... 123/431, 123/575, 295, 299, 304
See application file for complete search history.

(56) References Cited

U.S. PATENT DOCUMENTS

| | | | |
|---|---|---|---|
| 4,437,334 A * | 3/1984 | Laurenz | 73/35.07 |
| 4,480,616 A * | 11/1984 | Takeda | 123/406.52 |
| 4,739,614 A | 4/1988 | Katsuno et al. | |
| 4,745,741 A | 5/1988 | Masui et al. | |
| 5,056,490 A | 10/1991 | Kashima | |
| 6,505,603 B1 * | 1/2003 | Schray et al. | 123/299 |
| 6,711,893 B2 | 3/2004 | Ueda et al. | |
| 6,951,202 B2 * | 10/2005 | Oda | 123/406.29 |
| 7,152,574 B2 * | 12/2006 | Mashiki et al. | 123/299 |
| 7,159,568 B1 * | 1/2007 | Lewis et al. | 123/431 |
| 7,426,925 B2 * | 9/2008 | Leone et al. | 123/575 |
| 7,428,895 B2 * | 9/2008 | Leone et al. | 123/520 |
| 7,594,498 B2 * | 9/2009 | Lewis et al. | 123/431 |
| 2006/0196472 A1 | 9/2006 | Niimi | |
| 2007/0119421 A1 * | 5/2007 | Lewis et al. | 123/431 |
| 2007/0119422 A1 | 5/2007 | Lewis et al. | |
| 2009/0292444 A1 * | 11/2009 | Russell | 701/103 |

* cited by examiner

Primary Examiner — Mahmoud Gimie
Assistant Examiner — David Hamaoui
(74) Attorney, Agent, or Firm — Allan J. Lippa; Alleman Hall McCoy Russell & Tuttle LLP

(57) ABSTRACT

Various systems and methods are described for controlling operation of engine cylinders, where each cylinder has a first and second injector for delivering fuel. One example method maintains air-fuel ratio in the exhaust by adjusting fuel injection of a common fuel injector type among the cylinders, where different cylinders operate with different combinations of injectors.

22 Claims, 5 Drawing Sheets

1

FUEL BASED CYLINDER KNOCK CONTROL

FIELD

The present application relates to a method for controlling cylinders of an internal combustion engine operating with a variety of fuels of varying composition and fuel delivery options.

BACKGROUND AND SUMMARY

Engines may use various forms of fuel delivery to provide a desired amount of fuel for combustion in each cylinder. One type of fuel injection, or delivery, uses a port injector for each cylinder to deliver fuel to respective cylinders. Another type of fuel injection uses a direct injector for each cylinder. Engines have also been described using more than one injector to provide fuel to a single cylinder in an attempt to improve engine performance.

One such example (US 2007/0119422 A1) describes a flexible multiple-fuel engine using both port and direct injection, where different fuel types are provided to the injectors. For example, direct injection of ethanol may be used with port injected gasoline to address knock limitations, especially under boosted conditions. In this example, a desired setting for the various fuels may be predetermined using engine maps, and then adjusted based on feedback from a knock sensor, along with a spark retard, to mitigate the knock. Specifically, the effective knock suppression of the fuels can be varied responsive to operating conditions to improve engine efficiency while meeting engine output requirements.

However, the inventor herein has recognized several issues with such an approach. As one example, one particular cylinder may be more prone to knocking and consequently may start to develop knock before other cylinders within the engine, especially under certain operating conditions. If direction injection of ethanol is used in all of the cylinders to address knock when less than all of the cylinders may be prone to knock, ethanol may be over-used, and thereby overly depleted.

Thus, in one example, the above issues may be addressed by a method for controlling engine operation of an engine having a plurality of cylinders, each cylinder including a first and second injector for delivering fuel to the cylinder, the method comprising: operating a first cylinder to combust fuel delivered from both the first and second fuel injector of the first cylinder, and operating a second cylinder to combust fuel delivered from only one of the first and second fuel injectors of the second cylinder.

In one example, each of the plurality of cylinders of the engine may be capable of operating with a port injection of gasoline and a direct injection of ethanol. As such, a first cylinder may be more prone to knock as compared to the remaining cylinders. Accordingly, a direct injection of ethanol may be enabled at a lower torque, in the first cylinder. Consequently, under similar operating conditions, the first may be operating with direct injected ethanol in addition to port injected gasoline, while the remaining cylinders may be operating with port injected gasoline only. In another example, a first and second cylinder may be more prone to knock as compared to the remaining cylinders. Accordingly, the first and second cylinders may be adjusted together as a cylinder group and a direct injection of ethanol may be enabled in the knock-prone cylinder group at a lower torque, compared to other cylinders or cylinder groups. In this way, by specifically enabling direct injection of ethanol in knock-prone cylinders, or cylinder groups, engine knock may be abated without overly depleting ethanol.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for operating an engine in a vehicle with a plurality of fuel injector configurations for delivering fuel to each of the cylinders of the engine. The configuration of fuel delivery, as well as the fuel delivery, may be adjusted differently for different cylinders to address how engine knock constraints, air-fuel ratio constraints, and/or various other issues disparately affect various cylinders of the engine. For example, the fuel injection schedule of each cylinder may be independently varied, so that some cylinders may operate with a first fuel injection configuration, while others operate with a different fuel injection configuration, based on the likelihood of knock in respective cylinders. As such, a cylinder that is more prone to knocking may be scheduled to concurrently receive not only different amounts of various fuel types, but also differing delivery of the fuel by different fuel injection types. In one example, direct injection of an alcohol fuel may be used in knock-prone cylinders, while other cylinders operate without such injection. Thus, the charge cooling benefits of direct injection of alcohol can be obtained, without depleting such fuel in other cylinders.

Figure 1:
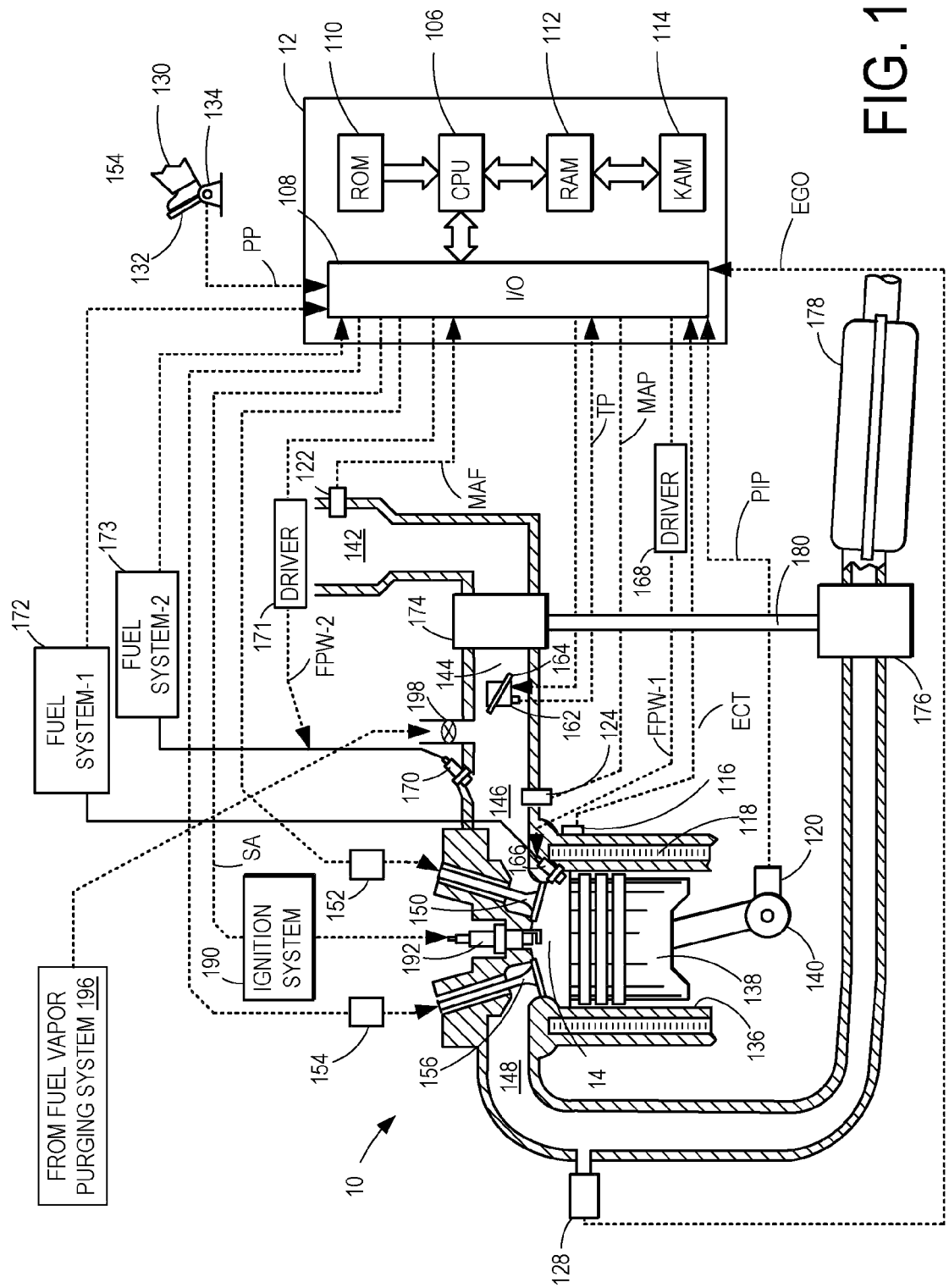
FIG. 1 shows an example embodiment of a combustion chamber operating with a plurality of fuel injector options.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. The supercharger may be a supercharger with a bypass or a clutched supercharger. Additionally, the boosting device may be arranged to provide serial or parallel boosting. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled to provide variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake air passage 146, rather than in cylinder 14, in a configuration that provides what is known as port injection of fuel (hereafter also referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The relative distribution of the total injected fuel among injectors 166 and 170 may be referred to as an injection type. For example, injecting all of the fuel for a combustion event via injector 166 may be an example of a first injection type; injecting all of the fuel for a combustion event via injector 170 may be an example of a second injection type; injecting two-thirds of the fuel for a combustion event via injector 166 and the other third of the fuel via injector 170 may be an example of a third injection type; injecting a third of the fuel for a combustion event via injector 166 and the other two-thirds of the fuel via injector 170 may be an example of a fourth injection type. Note that these are merely examples of different injection types, and various other types of injection and delivery may be used, and further the approach may be applied to more than two injectors as well. Additionally, it should be appreciated that port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems-1 and 2 172 and 173 may hold fuel with different fuel qualities, such as different fuel compositions. These differences may include different alcohol content, different octane, different heats of vaporization, different fuel blends, and/or combinations thereof etc. One example of fuels with different heats of vaporization could include gasoline as a first substance with a lower heat of vaporization and ethanol as a second substance with a greater heat of vaporization. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other feasible substances include water, a mixture of alcohol and water, a mixture of alcohols, etc. In still another example, both fuels may be alcohol blends with varying alcohol composition wherein the first fuel may be a gasoline alcohol blend with a lower concentration of alcohol than a gasoline alcohol blend of a second fuel with a greater concentration of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, etc.

Moreover, fuel characteristics of one or both fuel tanks may vary frequently. In one example, a driver may refill fuel tank of fuel system-1 172 with E85 one day, and E10 the next, and E50 the next, while fuel tank of fuel system-2 173 may have gasoline one day, and E10 the next, and gasoline the next. The day to day variations in tank refilling can thus result in frequently varying fuel compositions of each of the fuels in fuel systems-1 and 2 172 and 173, thereby affecting the fuel compositions and/or fuel qualities delivered by injectors 166 and 170, respectively. The differences in fuel composition and/or quality may hereon be referred to as fuel type. Also, the fuel types may be separately delivered to the combustion chamber, or mixed before delivery to the combustion chamber.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory chip 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Figure 2:
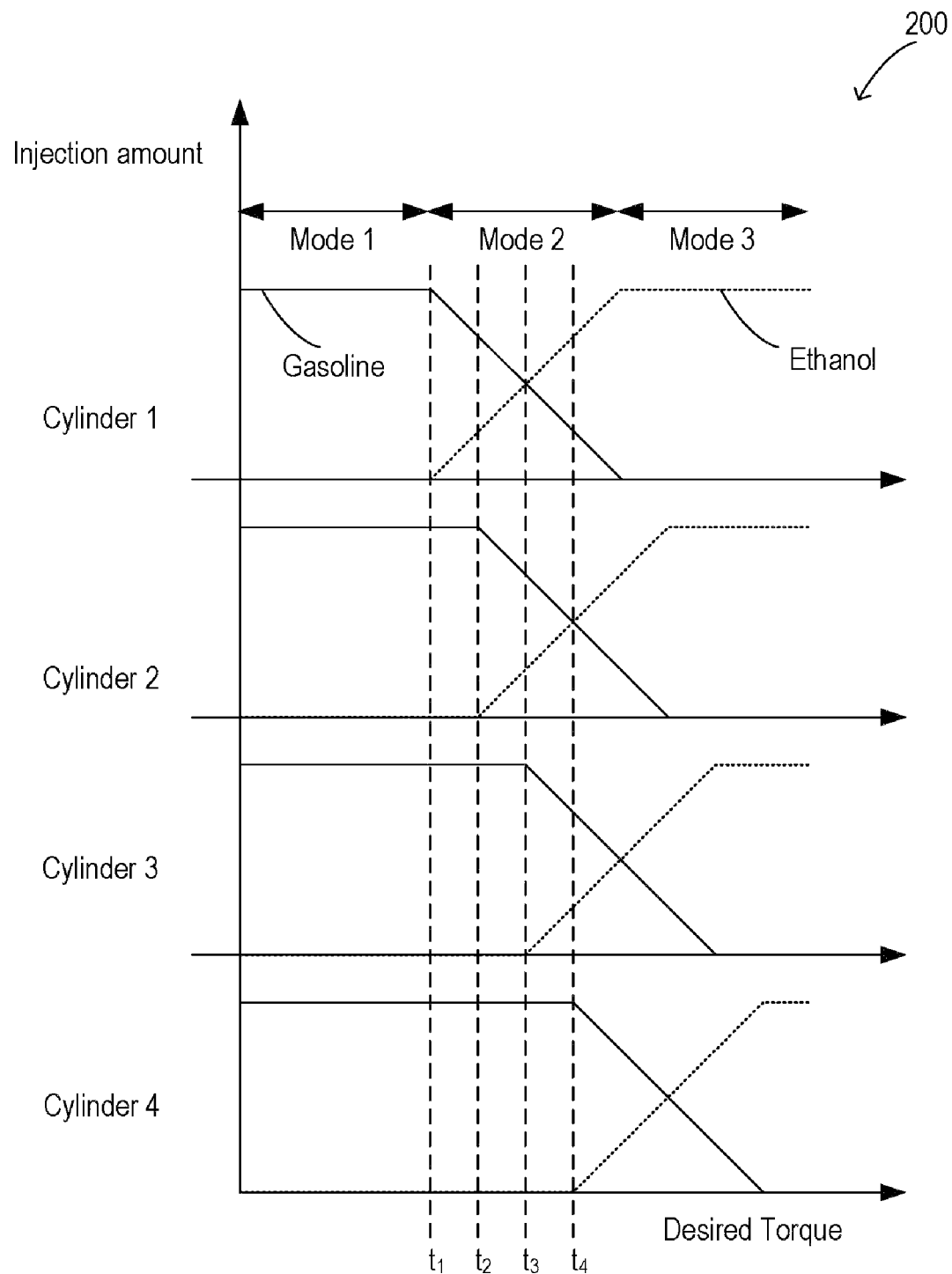
FIG. 2 shows a map illustrating variation in ratio of fuel injected by the different injectors responsive to a desired torque.

Engine 10 may further include a fuel vapor purging system 196 for storing and purging fuel vapors to the intake manifold of the engine via vacuum generated in the intake manifold. Fuel vapors originating in fuel tank of fuel system-1 172 and/or fuel system-2 173 may be stored in a fuel vapor storage canister. These fuel vapors may be purged to one or more cylinders of engine 10 including cylinder 14. The purging of fuel vapors may be controlled by controller 12 via fuel vapor purge valve 198. In this manner, fuel vapors may be stored and purged during some conditions to one or more cylinders of the engine where they may be combusted. Controller 12 may be configured to address engine knock by varying the schedule of injection type enablement in cylinders, where the schedule may further be based on a fuel type stored in one or more of fuel tanks of fuel systems-1 and 2 172 and 173. Controller 12 may vary the operation of a first cylinder to combust fuel delivered from both a first and second fuel injector of the first cylinder, and the operation of a second cylinder to combust fuel delivered from only one of the first and second fuel injectors of the second cylinder. In one example, the second injector is a direct injector and the first injector is a port injector. As such, a compilation of data pertaining to the knock history of individual cylinders, or cylinder groups, may be used to compute a map, such as depicted in FIG. 2, wherein for a given load and a desired torque as example parameters, a ratio of injection from the first and second injectors may be scheduled. The knock history of the engine may be stored in the keep alive memory 114 of controller 12. In one example, the knock history of the engine may indicate that the first cylinder is more prone to engine knock than the second cylinder, or the remaining cylinders, at least during an operating condition. For example, during high engine coolant temperatures, cylinder 1 may be more prone to knock than the remaining cylinders. Alternatively, during high humidity conditions, cylinder 2 may be more prone to knock than the remaining cylinders. As such, knocking may also occur at an earlier time in particular cylinders depending on operating conditions. Fuel injection to each cylinder may be configured such that the second fuel injector delivers fuel with a greater alcohol amount, or a greater octane, than the first injector. Responsive to the knock history, a setting and a schedule of the different injection types for the cylinders may be adjusted to enable biasing of an overall schedule toward greater use of direct injection and/or higher alcohol fuel delivery for particular cylinders. As such, the adjustment may be performed to the cylinders while they operate during a common engine cycle. In this way, based on the knocking history of one or more cylinders, an appropriate injection schedule can be achieved.

Figure 3:
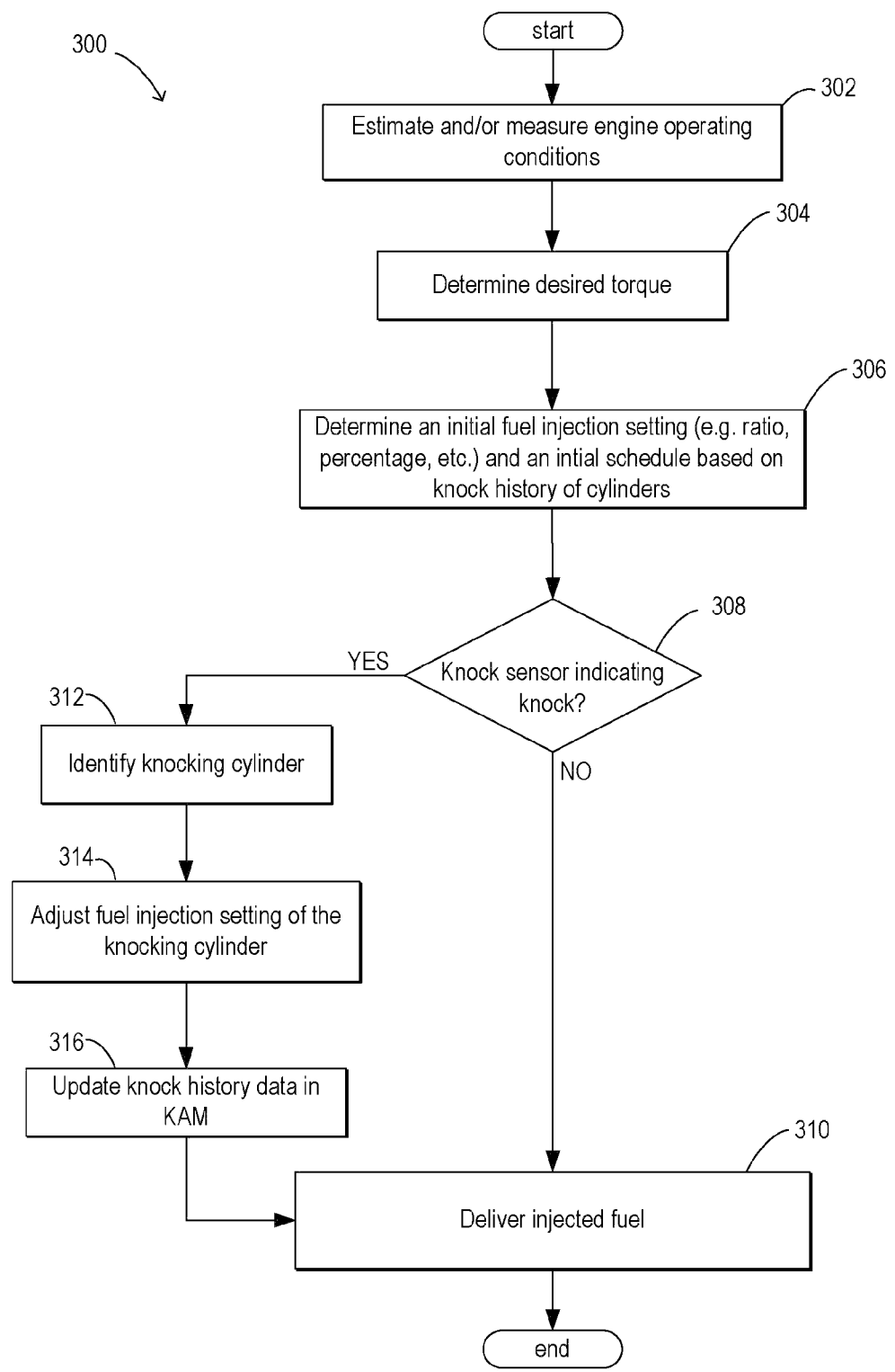
FIG. 3 shows a high level flow chart for cylinder knock control operations.
Figure 4:
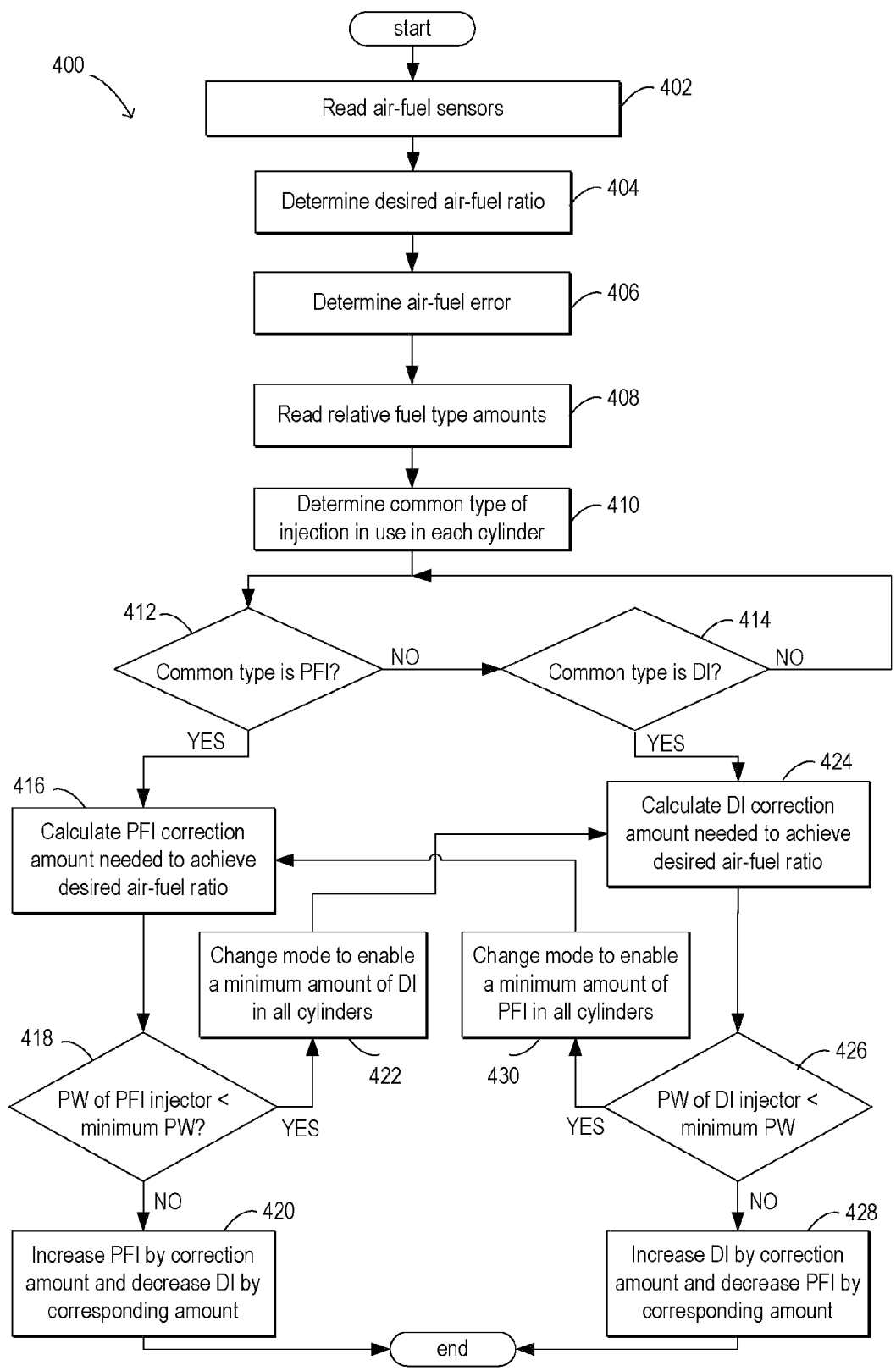
FIG. 4 shows a high level flow chart for adjusting air-fuel ratio errors following cylinder knock control operations.
Figure 5:
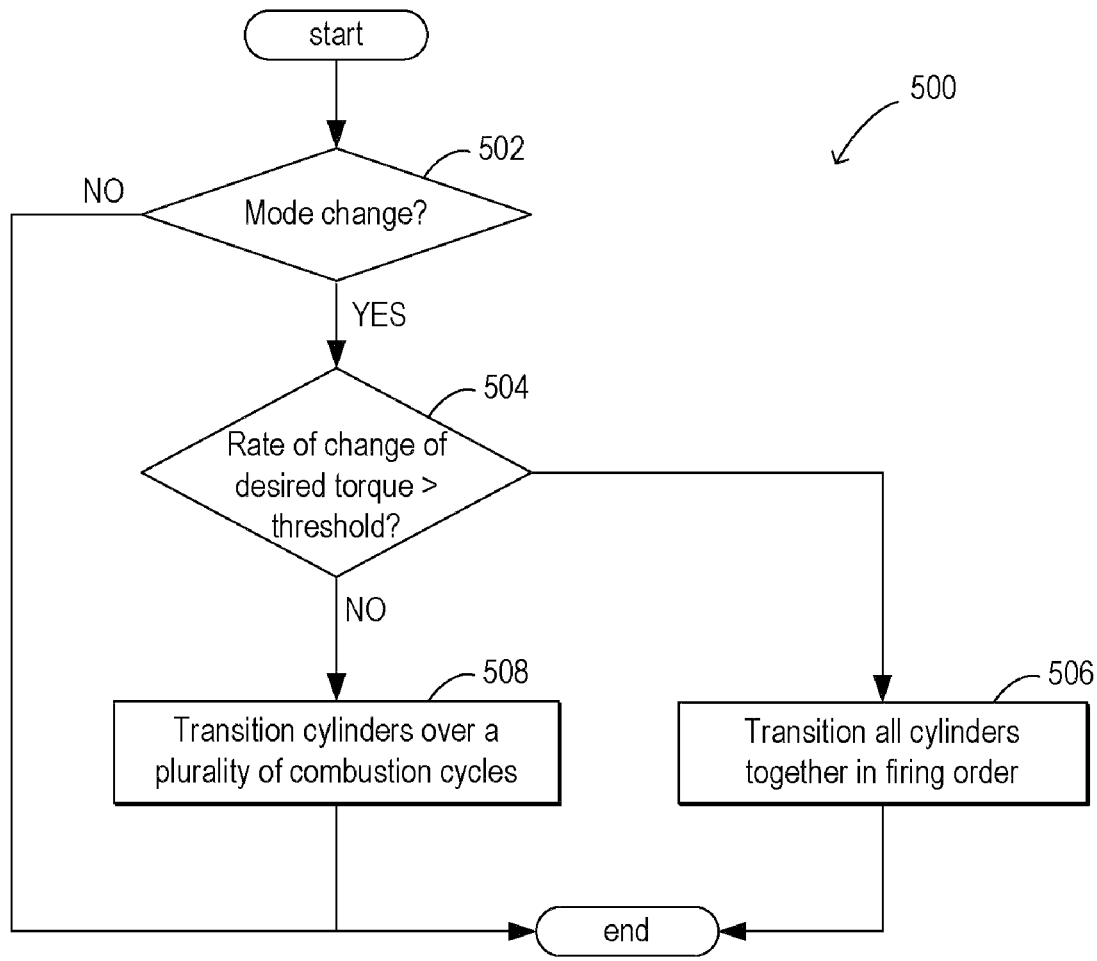
FIG. 5 shows a high level flow chart for transitioning between cylinders responsive to a torque rate of change.

Specifically, an initial fuel injection schedule may be mapped based on the knock history of the cylinders, an example of which is as shown in FIG. 2. Further, the knock history and fuel injection schedule may be updated in real time, as shown by the routine of FIG. 3. Air-fuel ratio control may be addressed by adjusting injection from a common type of fuel injector in use in each cylinder, as illustrated in FIG. 4. Additionally, as illustrated in FIG. 5, the control system may opt to transition the cylinders gradually, or one-at-a-time, over a plurality of combustion cycles, under selected conditions to reduce air-fuel and torque disturbances in the cylinders. In this way, knock and related engine operating constraints may be addressed in an engine taking into account different operation among different cylinders or cylinder groups.

As depicted in FIG. 2, in one embodiment, engine 10 may be configured to enable a port injection of a first fuel such as gasoline and a direct injection of a second fuel such as ethanol in each cylinder of a four cylinder engine. For a given load and/or desired torque, a scheduled ratio of the first and second injection types may be calculated using map 200 for each cylinder. Engine 10 operates in three example modes of fuel injection, as shown with respect to cylinder 1. Based on Map 200, controller 12 determines a mode of fuel injection and appropriately selects which fuel injector to enable and/or the desired ratio of the different fuel types.

In mode 1, a cylinder may operate with only a port fuel injection of a first fuel. This mode may be selected at lower speeds/loads when the cylinder is less susceptible to knock. Alternatively, mode 1 may be selected when the fuel tank of the direct injector 166 is empty, or when the direct injector is disabled due to other constraints.

In mode 3, a cylinder may operate with only a direct injection of the second fuel. This mode may be selected at higher speeds/loads wherein the charge cooling effects of direct injection fuel may be advantageously used to address knock constraints. Alternatively, mode 3 may be selected when the fuel tank of the port fuel injector 170 is empty, or when the port fuel injector is disabled due to other constraints.

In mode 2, a cylinder may operate with a varying ratio of port injected gasoline and direct injected ethanol. It will be appreciated that in mode 2, a ratio of port injected gasoline may be gradually decreased and a corresponding ratio of direct injected ethanol may be gradually increased as the desired torque increases. While FIG. 2 shows a linear relationship, various other approaches may also be used. Mode 2 may be selected at medium to high speeds/loads. Further, as elaborated herein, based on the knock history of each cylinder or cylinder group, the transition between modes may be enabled at a higher or lower torques for each cylinder or cylinder group by adjusting the fuel injection schedule, thereby addressing anticipated knock constraints.

While FIG. 2 shows each cylinder having each of the three modes described, it will be appreciated that in alternate embodiments, one or more cylinders may operate with an adjusted fuel injection schedule to utilize modes 1-2, without mode 3. Further, as illustrated below in a table, a variety of mixed modes of engine operation may be possible wherein each cylinder, operating during a common cycle, is configured to be working in one of the three example modes described above.

In one example, as depicted in FIG. 2, engine 10 may be operating with four cylinders. The knock history of the cylinders may indicate that cylinder 1 is most prone to knock. Accordingly, to suppress the early knocking found in cylinder 1, a transition from mode 1 into mode 2 may be enabled at a lower desired torque $t_1$. In this way, an initial direct injection of ethanol may be enabled in cylinder 1 at a lower desired torque in order to address knock constraints anticipated for cylinder 1, while the remaining cylinders (2-4) operate without direct injection of ethanol. A similar mode transition (from mode 1 to mode 2) may be enabled for cylinder 2, (the next most likely cylinder to knock), at a slightly higher torque $t_2$. As such, the mode-transition of a cylinder may also be affected in response to a sensor indicating knock in that cylinder. The sensor may be a knock sensor such as an accelerometer on the engine block, or an ionization sensor configured in the spark plug in each cylinder. The transitioning of the second cylinder to combust fuel from both the first (e.g., port) and second (e.g., direct) fuel injector occurs while continuing operation of the first cylinder. Similarly, an initial direct injection of ethanol may be enabled in cylinders 3 and 4 at higher torque levels, $t_3$ and $t_4$, respectively, while continuing operation of cylinder 1 and 2. It will be appreciated that adjusting the fuel injection schedule where a transition from mode 1 to mode 2 occurs in each cylinder may consequently also affect the fuel injection schedule at which a similar transition from mode 2 to mode 3 may occur in each cylinder. In this way, by varying the schedule at which a direct injection (of a fuel with a greater alcohol content) may be enabled in an individual cylinder or cylinder group, responsive to the knocking history of the cylinder or cylinder group, knocking may be addressed by judicious use of direct injection and/or a high alcohol content fuel.

An example of the plurality of mixed modes of engine operation between two example cylinders is depicted in the following table. The different mixed modes may be selected by controller 12 based on the operating conditions. The table further indicates a common injection type that may be used by the controller to adjust for air-fuel ratio disturbances, as further elaborated in FIG. 4. It will be appreciated that in the examples below, the injection types available are direct and port injection. Further, a first fuel reservoir is coupled to the port injectors and a second fuel reservoir is coupled to the direct injectors. Still further, the first reservoir holds fuel with lower alcohol content than the second reservoir. However, various alternatives are possible, such as two port injectors per cylinder or two direct injectors per cylinder. Additionally, while the table lists only two cylinders, additional cylinders may be operated according to one of the listed modes, or still other modes. Likewise, the cylinders listed may represent groups of cylinders.

| Mode | Cylinder 1 | Cylinder 2 | Common injection type |
|------|------------|------------|------------------------|
| 1    | PFI and DI | PFI and DI | PFI or DI              |
| 2A   | PFI        | PFI and DI | PFI                    |
| 2B   | DI         | PFI and DI | DI                     |
| 3A   | PFI        | PFI        | PFI                    |
| 3B   | DI         | DI         | DI                     |
| 3C   | PFI        | DI         | N/A                    |

By way of example and explanation of the table, the first full row describes an example for a first operating mode, mixed mode 1, wherein the controller 12 is configured to deliver fuel from both a first port injector and a first direct injector to the first cylinder to carry out combustion in the first cylinder; and deliver fuel from both a second port injector and a second direct injector to the second cylinder to carry out combustion in the second cylinder. Mixed mode 1 may be selected during medium to high torque, for example. As such, air-fuel ratio disturbances herein may be adjusted with a common port injection or direct injection for example.

During a second operating mode, mixed mode 2, controller 12 is configured to deliver fuel from only one of the first port injector and the first direct injector to the first cylinder to carry out combustion in the first cylinder; and deliver fuel from both of the second port injector and second direct injector to the second cylinder to carry out combustion in the second cylinder. As such, one of two possible mixed sub-modes, 2A or 2B, may be selected by controller 12, based on the operating conditions. In mixed sub-mode 2A, cylinder 1 may receive fuel from the port injector only while cylinder 2 continues operating with port and direct injection. In one example, mixed sub-mode 2A may be selected at medium to high torques when cylinder 2 is prone to knock such that the direct injection in cylinder 2 only may address knock therein. Air-fuel ratio disturbances herein may be adjusted with a common port injection. In mixed sub-mode 2B, cylinder 1 may receive fuel from the direct injector only while cylinder 2 continues operating with port and direct injection. In one example, mixed sub-mode 2B may be selected at high torque and when the direct injector in cylinder 2 may be degraded (e.g., clogged). Air-fuel ratio disturbances may be adjusted with a common direct injection.

During a third operating mode, mixed mode 3, controller 12 is configured to deliver fuel from only one of the first port injector and the first direct injector to the first cylinder to carry out combustion in the first cylinder; and deliver fuel from only one of the second port injector and second direct injector to the second cylinder to carry out combustion in the second cylinder. As such, one of three possible mixed sub-modes, 3A-C, may be selected by controller 12, based on the operating conditions. In mixed sub-mode 3A, both cylinders receive fuel from a port injector only. Mixed sub-mode 3A may be selected, for example, at lower torques when no knock is anticipated, or during cold starts. Air-fuel ratio disturbances may also be adjusted with port injection. In mixed sub-mode 3B, both cylinders receive fuel from a direct injector only. Mixed sub-mode 3B may be selected, for example, at higher torques or other knock-prone operating conditions. Herein, air-fuel ratio disturbances may also be adjusted with direct injection.

In mixed mode 3C, cylinder 1 may receives fuel from port injection only while cylinder 2 receives fuel from direct injection only. Mixed sub-mode 3C may be selected, for example, at low torque when the port injector in cylinder 2 may be degraded. As such, due to a lack of a common injection type, air-fuel ratio disturbances may be compensated with different injection types in different cylinders or cylinder group. It will be appreciated that some mixed mode operations, such as mixed mode 3C, may not be used.

Air fuel ratio disturbances in each mode, or during mode transitions, may be managed via feedback from air-fuel ratio sensors using a common injection type, as explained in FIG. 4. For example, during the second and third modes, the controller adjusts the first port injector and the second port injector responsive to an air-fuel ratio sensor coupled in an exhaust of the first and second cylinders, and during the first mode, adjusts the first direct injector and the second direct injector responsive to the air fuel ratio sensor.

It will be appreciated that in alternate embodiments, controller 12 may be configured to address knock using spark timing adjustment only, or using a combination of spark timing adjustment and injection type and/or fuel type adjustment. When balancing spark timing and injection type enablement, the controller may choose an injection type depending on the fill level of the fuels in fuel systems-1 and 2 172 and 173 and/or the rate of depletion of the fuels. In one example, if the level of ethanol in the fuel tank of the direct injector is running low, the controller 12 may opt to use some spark retard along with some direct injection of ethanol, instead of only using direct injection to mitigate the knock. In another example, when operating for extended periods of time, the controller 12 may choose to conserve use of the ethanol fuel of the direct injector by partially controlling knock with spark retard, thereby increasing consumption of the port injected fuel, (e.g., gasoline).

FIG. 3 describes a control system routine for an internal combustion engine allowing adjustment of engine knock constraints on an individual cylinder or cylinder group basis. Specifically, the routine determines an initial ratio of injection types and an initial fuel injection schedule responsive to the desired torque and the respective knock history of the cylinders. In one example, the control system allows differential enablement of direct injection of ethanol in each cylinder or cylinder group responsive to knock constraints learned for each cylinder or cylinder group. The routine also responds to feedback information from a knock sensor, thereby addressing unexpected knock constraints and further updating the knock history of the cylinders or cylinder groups.

At 302, the engine operating conditions are estimated and/or measured. These include, but are not limited to, engine temperature, engine coolant temperature, engine speed, manifold pressure, air-fuel ratio, equivalence ratio, cylinder air amount, spark timing, barometric pressure, etc.

At 304, the desired engine output torque is determined. In one example, the desired torque may be estimated from a pedal position signal. At 306, based on the estimated engine operating conditions and the desired torque, and further based on the knock history of the cylinders, an initial fuel injection setting and schedule may be determined. A map, such as Map 200 illustrated in FIG. 2, may be used to determine the initial setting and schedule of fuel injection types for each cylinder or cylinder group. The initial settings may include determining a mode of fuel injection, or operating mixed-mode, (for example all port fuel injection, all direct injection, or part port fuel—part direct injection, as previously elaborated in FIG. 2 and the ensuing table), and an initial ratio or percentage of injection between the direct injector and the port fuel injector. Other settings may include determining a timing of injection. In one example, it may be determined that at the desired torque and current operating conditions, cylinder 1 tends to knock first, and accordingly, the order of commencing of direct injection may be cylinder 1 followed by cylinders 2, 3 and 4. Further, it may be determined that at the desired torque and current operating conditions, cylinders 1-2 may be in mode 2, where cylinder 1 operates with 80% port fuel injected gasoline and 20% direct injected ethanol and cylinder 2 operates with 90% port injected gasoline and 10% direct injected ethanol, while cylinders 3-4 may be in mode 1 operating with a port fuel injection of gasoline only. This is simply one example combination.

At 308, a knock sensor is read to determine if there is a feedback indication of knock. If no knock is detected, then at 310, fuel is delivered to the cylinders from the respective fuel injectors based on the computed initial settings and schedules. If however, a knock indication is received at 308, then at 312, the knocking cylinder is identified. In one example, the knocking cylinder may be identified by on-line processing of the knock sensor data to align the knock indication with engine firing, and thereby identify which cylinder(s) are knocking.

At 314, responsive to the knock sensor indication, the fuel injection setting of the knocking cylinder may be adjusted with an increase in a direct injection of ethanol fuel, to thereby mitigate the knock. In one example, if unanticipated knocking is detected in cylinder 3, then the fuel injection setting of cylinder 3 may be adjusted from operating on 100 % port injected gasoline to operating with 95% port injected gasoline and 5% direct injected ethanol. In another example, the controller may change operating modes, selecting a mode in response to feedback from the knock sensor. Air-fuel ratio disturbances may be adjusted by performing air-fuel ratio adjustments, such as provided by the routine of FIGS. 4-5. At 316, the knock history data of the cylinder may be updated in the KAM of controller 12, so that on the next iteration of routine 300, an updated initial fuel injection schedule may be accordingly computed. In this way, by adjusting the fuel injection setting and schedule of an engine on an individual cylinder or cylinder group basis, based on a given cylinder or cylinder group knock history, cylinder knock constraints may be addressed in a timely fashion, without affecting engine performance. Adaptive learning and updating of knock history further allows knock constraints to be better anticipated.

FIG. 4 describes an air-fuel ratio compensation routine that may be performed by controller 12 following cylinder knock control routine 300, to compensate for air-fuel ratio errors. However, the routine additionally selects which fuel injectors are used to adjust the fuel injection to maintain the desired air-fuel ratio. In other words, there may be various issues with air-fuel ratio control when operating different cylinders with different fuel injection types. As such, in one embodiment, when a common injector type is available in all operating cylinders, that injector type is selected for adjusting fuel injection to maintain air-fuel ratio control. The common injector type may be selected by a controller based on the mode or mixed-mode of engine operation (as explained above in FIG. 2 and the ensuing table). This enables more repeatable air-fuel ratio control, e.g., since a common injection type is used in each cylinder. Irrespective of which injection type is available in all operating cylinders, the injection type with less wall wetting (or puddling) dynamics may be selected for adjusting fuel injection to maintain air-fuel ratio control. This not only enables more repeatable air-fuel control, since each cylinder uses a common injection type, but also significantly reduces puddling dynamic disturbances.

In a first example, the engine may be in a second operating mode, specifically mixed sub-mode 2A, wherein some cylinders combust fuel delivered from only the port fuel injector (and without direct injection), while others operate with port and direct injection. In this case, an air-fuel ratio may be maintained by adjusting fuel injection of the port injector in all the cylinders, for example based on feedback from an exhaust air-fuel ratio sensor coupled to the exhaust of the cylinders. While this may increase puddling dynamic effects in air-fuel ratio control, because disturbances may mostly be common among the cylinders, effective air-fuel ratio control may be achieved. It will be appreciated that, concurrently, the direct injector in the cylinders operating with direct injection, may be adjusted independent of the exhaust air-fuel ratio sensors.

In a second example, specifically in mixed sub-mode 2B, some cylinders operate with direct injection (and without port injection), while others operate with port and direct injection. In this case, direct injection in the cylinders is adjusted to maintain a desired air-fuel ratio. Here, puddling dynamic effects in air-fuel ratio control are mitigated, while also allowing common air-fuel control among the cylinders.

In a third example, the engine may be operated with some cylinders having only a first injector delivering fuel and other cylinders having both a first and second injector delivering fuel. In the context of a four-cylinder engine, each cylinder having a port and direct injection, two cylinder may operate with port injection and two with port and direct injection. Continuing with the third example, the fuel injection of the first injectors of each cylinder may be adjusted to maintain air-fuel ratio, at least during some operating conditions. During other conditions, an alternative fuel injection adjustment may be used to maintain air-fuel ratio.

Such an approach may be used for feedback air-fuel ratio control responsive to exhaust gas air-fuel ratio sensor, as shown in routine 400 of FIG. 4. In an alternate embodiment, the air-fuel ratio control routine of FIG. 4 may be further configured to adjust an air-fuel ratio with fuel vapor purging compensation and learning.

At 402, the air-fuel sensors are read. At 404, a desired air-fuel ratio is determined. In one example, the desired air-fuel ratio is stoichiometric. At 406, the air-fuel error is computed from the desired air-fuel ratio (as estimated at 404) and the estimated air-fuel ratio (as estimated at 402). It will be appreciated that in an alternate embodiment of routine 400, for example when fuel vapor purging is enabled in engine 10, a fuel vapor compensation amount may be considered at 406 during the computation of the air-fuel error. As such, a fuel vapor composition and concentration may be learned by a sensor located in the fuel vapor purging passage and used to calculate a revised air-fuel error.

At 408, the relative fuel type amounts in each cylinder are read. Specifically, the fuel injection settings (mode of fuel injection, an initial ratio or percentage of injection types, etc.) in use in each cylinder, or cylinder group, is read. Accordingly, at 410, a common type of injection in use in each cylinder may be determined.

In one example, at a given torque, the engine may be operating in mixed mode 2A wherein cylinder 1 is operating with 90% port injected gasoline and 10% direct injected ethanol while cylinders 2-4 are operating with 100% port injected gasoline only. In this scenario, the common type of injection is the port injection. In another example, at a given torque, the engine may be operating in mixed mode 2B wherein cylinder 1 may be operating with 100% direct injected ethanol while cylinders 2-4 may be operating with varying ratios of port injected gasoline and direct injected ethanol. In this scenario, the common type of injection is the direct injection.

At 412, it is determined if the port injection of gasoline (PFI) is the common type of injection. If yes, then at 416, a PFI correction amount may be calculated to achieve the desired air-fuel ratio. At 418, based on the PFI correction amount computed, it is determined if the pulse width (PW) of the port fuel injector is below a minimum pulse width threshold. If not, then an air-fuel ratio correction using a common port injection may be applied and accordingly, at 420, the port fuel injection may be increased/decreased by the correction amount while decreasing/increasing the direct injection by a corresponding amount. In this way, the controller adjusts port injection in all engine cylinders when each engine cylinder operates using at least a port injector.

If at 412 it is determined that port injection of gasoline (PFI) is not the common type of injection, then it is verified whether direct injection (DI) of ethanol is the common type of injection. If yes, then at 424, a DI correction amount may be calculated to achieve the desired air-fuel ratio. At 426, based on the DI correction amount computed, it is determined if the pulse width (PW) of the direct injector is below a minimum pulse width threshold. If not, then an air-fuel ratio correction using a common direct injection may be applied and accordingly, at 428, the direct injection may be increased/decreased by the correction amount while decreasing/increasing the port fuel injection by a corresponding amount. In this way, the controller adjusts direct injection in all engine cylinders when each engine cylinder operates using at least a direct injector.

In contrast, if at 418 it is determined that the pulse width (PW) of the port fuel injector is below a minimum pulse width threshold, then an air-fuel ratio compensation using a common port injection may not be applied. Accordingly, at 422, a mode change may be effected in all the cylinders to enable a minimum amount of direct injection in all the cylinders. In one example, all cylinders of the engine may be transitioned from a first operating mode to a second operating mode. Alternatively, if the pulse width of the port fuel injector of a particular cylinder is below the minimum pulse width threshold, a mode transition may be performed only in that cylinder. It will be appreciated that when transitioning from the first mode to the third mode, the engine may make the transition via the second operating mode.

Subsequently, the routine may continue to 424 to calculate a DI correction amount to achieve the desired air-fuel ratio. Analogously, if at 426 it is determined that the pulse width (PW) of the direct injector is below a minimum pulse width threshold, then an air-fuel ratio compensation using a common direct injection may not be applied. Accordingly, at 430, a mode change may be effected in all the cylinders to enable a minimum amount of port fuel injection in all the cylinders. Subsequently, the routine may continue to 416 to calculate a PFI correction amount to achieve the desired air-fuel ratio. Thus, the controller may select the mode based on reaching a minimum pulse width of an injector. It will be appreciated that while in some cases a common injection type may be used for air-fuel ratio control, during alternate circumstances, an un-common injection type may be alternatively selected.

FIG. 5 describes a routine 500 that may be performed by the control system to enable a more gradual transition of the cylinders over a plurality of combustion or engine cycles under some conditions, compared to a less gradual transition under other conditions. As such, during a regular engine cycle, each cylinder may combust once, for example in the firing order. The more gradual transition, when available, may enable reduced air-fuel disturbances in the cylinders.

At 502, it is determined if a mode change has occurred. As previously elaborated in FIG. 2, the engine may be operating in various modes or mixed modes, such as the three example modes of FIG. 2 and the mixed-modes of the ensuing table. Accordingly, it may be determined if while performing the cylinder knock control routine of FIGS. 3-4, a mode change has occurred or is requested. If no mode change has occurred, then the routine may end. If however a mode change has occurred, then at 504, it is determined if the rate of change of the desired torque is above a minimum threshold. If the rate of change is above the minimum threshold, then the cylinders may transition less gradually and accordingly, at 506, all the cylinders may be transitioned together in the appropriate firing order so that all engine cylinders change mode in one engine cycle. However, if the rate of change is not above the minimum threshold, then one or more cylinders or cylinders groups may transition between modes more gradually. Accordingly, at 508, the cylinders may be transitioned in the appropriate firing order over a plurality of combustion or engine cycles.

In one example, in an engine operating with four cylinders, when the change in desired torque is above the threshold, the four cylinders may be transitioned over four sequential combustion cycles, in the appropriate firing order. In another example, when the change in desired torque is below the threshold, the cylinders may transition modes more gradually. Accordingly, the four cylinders may be transitioned over twelve combustion cycles, for example, allowing more time after the firing of each cylinder such that air-fuel and torque disturbances may be reduced. Further, the transitioning between the cylinders may occur in a pre-defined pattern, starting with the cylinder most likely to knock under the current operating conditions, for example. Based on adaptive learning, the pre-defined pattern may be regularly updated and the transition order accordingly adjusted.

In this way, knock constraints may be addressed in an engine on an individual cylinder or cylinder group basis by adjusting the respective fuel injection based on knock history. Further, by gradually transitioning fuel injection between the cylinders when available, air-fuel and torque disturbances may be reduced.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine having a plurality of cylinders, each cylinder including a first and second fuel injector, the first fuel injectors having a different fuel injector type than the second fuel injectors, comprising:
   operating a first cylinder to combust fuel delivered from both the first and second fuel injectors of the first cylinder;
   operating a second cylinder to combust fuel delivered from only one of the first and second fuel injectors of the second cylinder; and
   among the first and second fuel injectors of the first and second cylinders, adjusting fuel injection of only those fuel injectors having a common fuel injector type among the first and second cylinders to maintain air-fuel ratio of the first and second cylinders and adjusting fuel injection of at least one fuel injector having an un-common fuel injector type among the first and second cylinders independent of air-fuel ratio, wherein the operation of the injectors is conditional based on which operating injectors are common between the first and second cylinders.

2. The method of claim 1 wherein the second injectors are direct injectors and the first injectors are port injectors, and where the first cylinder is more prone to engine knock than the second cylinder, at least during an operating condition.

3. The method of claim 2 where the first and second cylinders operate during a common engine cycle.

4. The method of claim 3 where the second, direct, injectors deliver fuel with a greater alcohol amount than the first, port, injectors, the method further comprising selectively adjusting spark retard in response to engine knock during a first condition, and adjusting fuel injection of the second, direct, injectors in response to knock during a second condition.

5. The method of claim 4 further comprising transitioning the second cylinder to combust fuel delivered from both the first and second fuel injectors of the second cylinder, while continuing operation of the first cylinder.

6. The method of claim 4 wherein the second cylinder combusts fuel delivered from only the first, port, fuel injector, the method further comprising adjusting fuel injection of the port injector in both the first and second cylinders to maintain the air-fuel ratio.

7. The method of claim 6 further comprising adjusting fuel injection of the port injectors in both the first and second cylinders based on feedback from an exhaust air-fuel ratio sensor coupled to exhaust of the first and second cylinders, where the second, direct, injector in the first cylinder is adjusted independent of feedback from the exhaust air-fuel ratio sensor.

8. The method of claim 1 where the second injector delivers fuel with a greater octane than the first injector.

9. A method for an engine including a first port injector and a first direct injector coupled to a first cylinder of the engine, a second port injector and a second direct injector coupled to a second cylinder of the engine, a first fuel reservoir coupled to the port injectors, and a second fuel reservoir coupled to the direct injectors, the method comprising:
during a first operating mode:
delivering fuel from both the first port injector and first direct injector to the first cylinder to carry out combustion in the first cylinder;
delivering fuel from both the second port injector and second direct injector to the second cylinder to carry out combustion in the second cylinder; and
maintaining an air-fuel ratio in the first and second cylinders by adjusting the first and second direct injectors in response to an exhaust air-fuel ratio while adjusting the first and second port injectors independent of the exhaust air-fuel ratio; and
during a second operating mode:
delivering fuel from the first port injector and not from the first direct injector to the first cylinder to carry out combustion in the first cylinder;
delivering fuel from both the second port injector and second direct injector to the second cylinder to carry out combustion in the second cylinder; and
maintaining the air-fuel ratio in the first and second cylinders by adjusting the first and second port injectors in response to the exhaust air-fuel ratio while adjusting the second direct injector independent of the exhaust air-fuel ratio,
wherein the operation of the injectors is conditional, where the condition is which operating injectors are common between the first and second cylinders in the second operating mode.

10. The method of claim 9 further comprising, during a third operating mode: delivering fuel from only one of the first port injector and first direct injector to the first cylinder to carry out combustion in the first cylinder; and delivering fuel from only one of the second port injector and second direct injector to the second cylinder to carry out combustion in the second cylinder, where the engine operates in the second mode when transitioning from the first mode to the third mode.

11. The method of claim 9 further comprising transitioning from the first mode to the second mode based on reaching a minimum pulse width of an injector.

12. The method of claim 10 further comprising, during the second mode and the third mode, adjusting the first port injector and second port injector responsive to an exhaust air-fuel ratio sensor coupled in an exhaust of the first and second cylinders, and during the first mode, adjusting the first direct injector and the second direct injector responsive to the exhaust air-fuel ratio sensor.

13. The method of claim 9 further comprising selecting one of the first and second modes in response to feedback from a sensor, including a knock history of one or more cylinders.

14. The method of claim 13 wherein the sensor includes at least one of a knock sensor, cylinder pressure sensor, and ionization sensor.

15. The method of claim 13 wherein the sensor includes a knock detecting device.

16. The method of claim 9 wherein the first reservoir holds fuel with lower alcohol content than the second reservoir.

17. The method of claim 9 wherein the engine further comprises a boosting device.

18. A method for controlling an engine having a plurality of cylinders, each cylinder having different injectors including a first and second injector, comprising:
operating some cylinders with only the first injector delivering fuel and other, different, cylinders with both the first and second injectors delivering fuel; while
adjusting fuel injection of each cylinder's first injector based on exhaust air-fuel ratio; while
adjusting fuel injection of the second injectors independent of exhaust air-fuel ratio, wherein the operation of the injectors is conditional based on which operating injectors are common between the cylinders operating with only the first injector delivering fuel and the other cylinders operating with both the first and second injectors delivering fuel.

19. The method of claim 18 wherein the different injectors include a port injector and a direct injector.

20. The method of claim 19 wherein fuel injection of the second injector in the other cylinders is independent of feedback from an exhaust air-fuel ratio sensor.

21. The method of claim 19 further comprising adjusting port injection in all engine cylinders when each engine cylinder operates using at least a port injector.

22. The method of claim 19 further comprising adjusting direct injection in all engine cylinders when each engine cylinder operates using at least a direct injector.

* * * * *